M. ZAJAC.
ARMORED AUTOMOBILE.
APPLICATION FILED MAR. 16, 1918. RENEWED JAN. 7, 1919.
1,305,637.
Patented June 3, 1919.
3 SHEETS—SHEET 3.
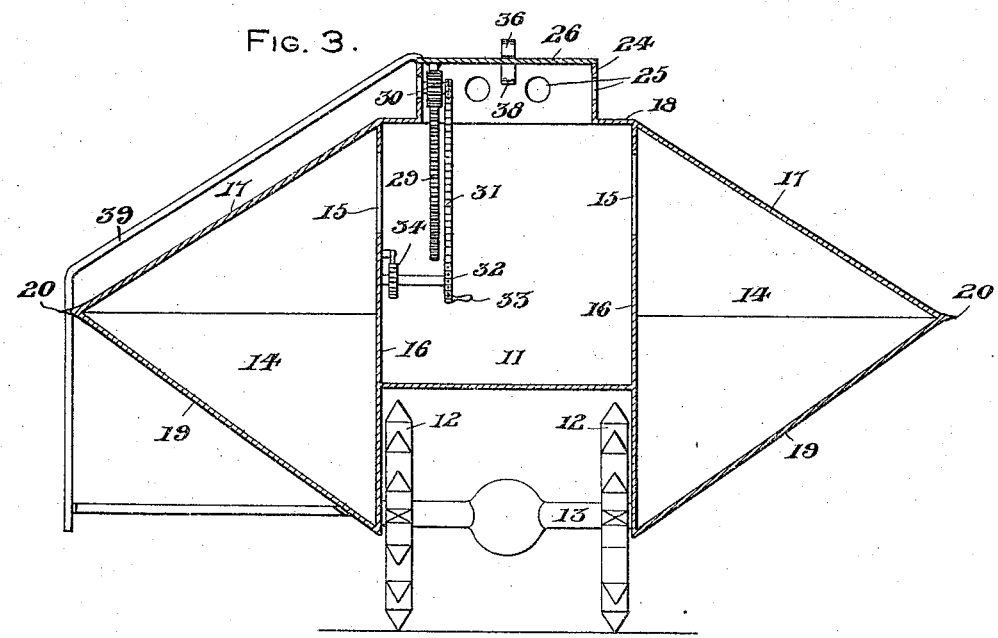
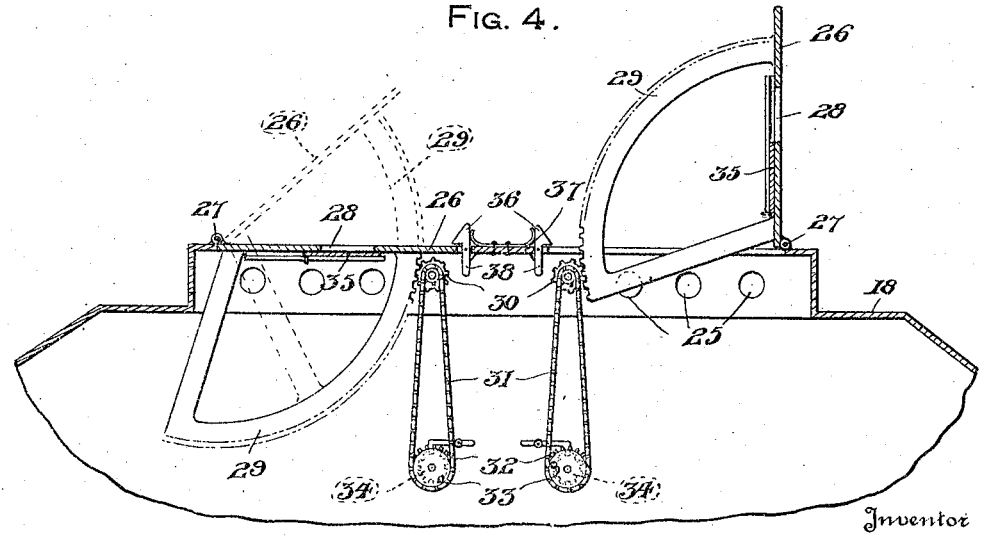
Inventor
M. Zajac
By A. M. Wilson
Attorney

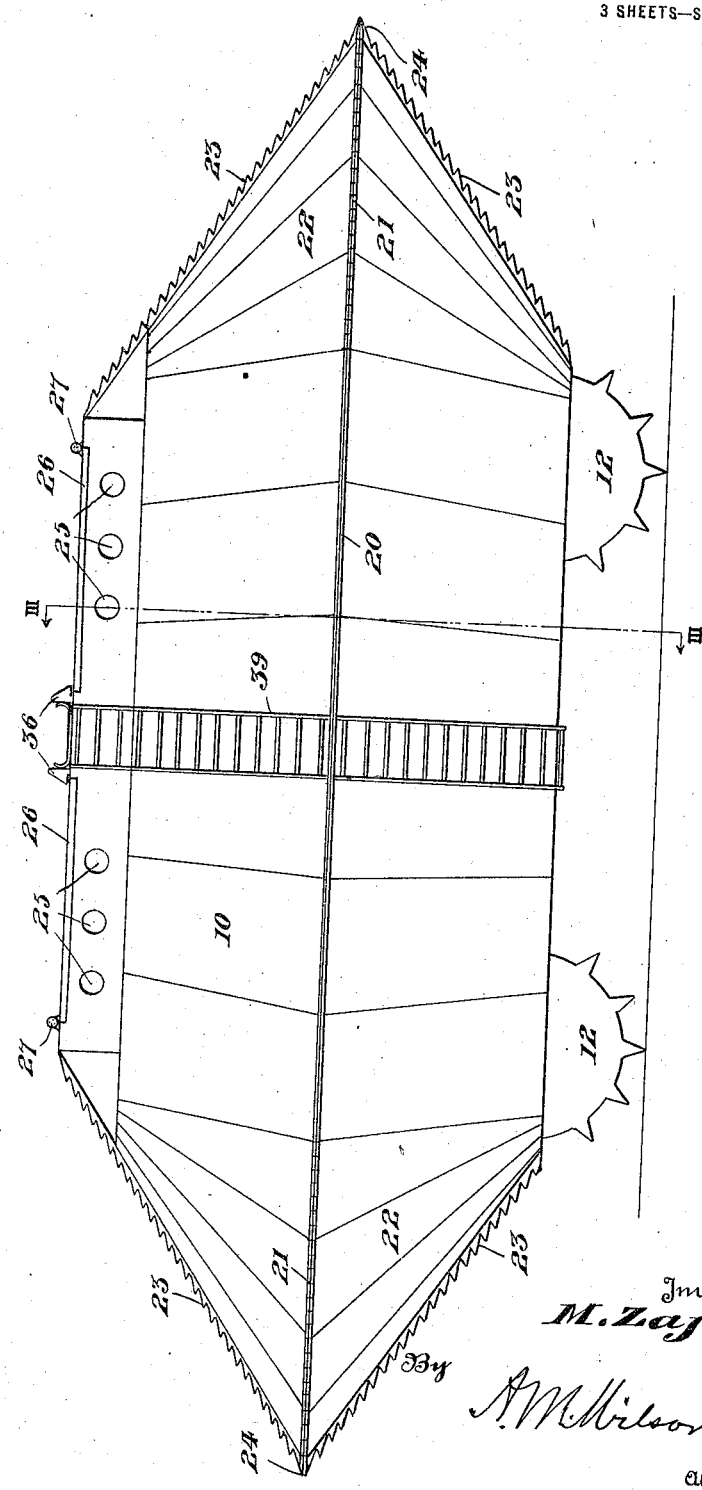

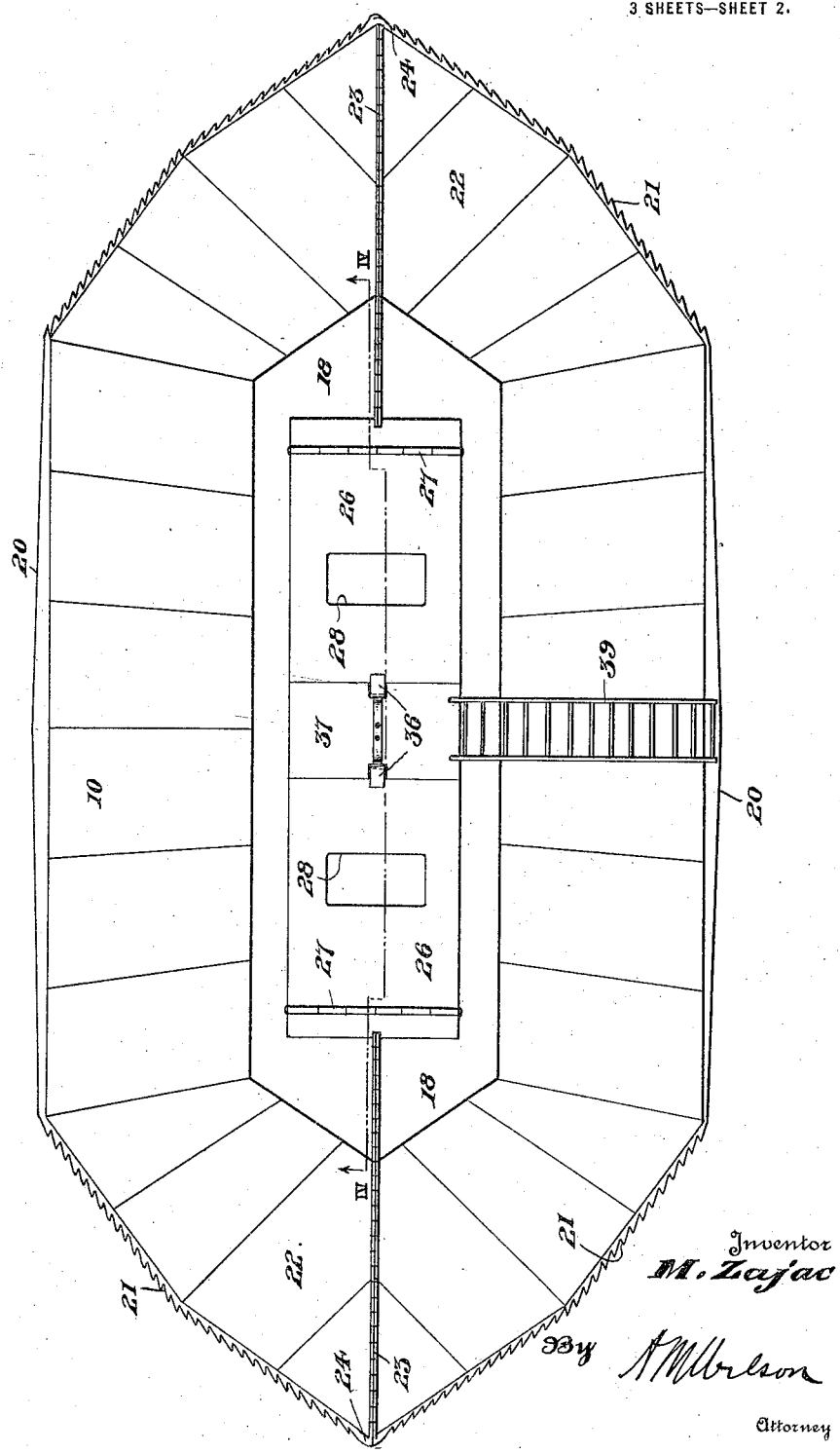

UNITED STATES PATENT OFFICE.

MARCIN ZAJAC, OF CHICOPEE, MASSACHUSETTS.

ARMORED AUTOMOBILE.

1,305,637.     Specification of Letters Patent.     Patented June 3, 1919.

Application filed March 16, 1918, Serial No. 222,922. Renewed January 7, 1919. Serial No. 270,064.

*To all whom it may concern:*

Be it known that I, MARCIN ZAJAC, a subject of the Emperor of Austria, residing at Chicopee, in the county of Hampden and State of Massachusetts, have invented certain new and useful Improvements in Armored Automobiles, of which the following is a specification.

The primary object of the invention is the provision of an armored automobile or tank especially constructed for cutting its way through barbed wire entanglements and other barriers during a charge upon the enemy or while the army is on the march, the device possessing great strength and arranged for carrying soldiers' firearms and ammunition.

A further object of the invention is the provision of an automobile arranged for carrying soldiers and guns after the manner of a traveling fort, the device being suitably armored for preventing bullets from injuring the soldiers while the arrangement is made to permit the soldiers to fire upon the enemy from their protected positions within the device.

In the drawings forming a part of this application and in which like numerals refer to corresponding parts throughout the several views:—

Figure 1 is a side elevational view of the device;

Fig. 2 is a top plan view of the same;

Fig. 3 is a vertical transverse sectional view taken upon line 3—3 of Fig. 1; and Fig. 4 is a vertical longitudinal sectional view taken upon line 4—4 of Fig. 2.

The armored automobile of my design provides a body 10 of the general form in plan as shown in Fig. 2 constructed of bullet-proof material such as sheet metal and providing an inner chamber or cabin 11 of the car for the accommodation of soldiers with their guns, it being understood that the body 10 is mounted for traveling upon suitable spiked wheels 12 having axles 13.

Side compartments 14 are arranged entirely surrounding the cabin 11 and adapted to hold goods such as stores and ammunition placed therein through openings such as windows 15 in the side walls 16 of the cabin 11.

The upper sides 17 of the compartment 14 are in the form of an outwardly and downwardly sloping roof merging with the outer edges of the deck 18 of the cabin 11 while the lower wall or bottom 19 of the compartment 14 correspondingly slopes inwardly and downwardly for meeting the depending portions of the cabin walls 16.

An outwardly projecting ledge 20 is arranged around the body 10 centrally thereof at the point of meeting of said roof 17 and bottom 19, the ledge 20 having a sharpened outer edge with flaring portions of the ledge formed at opposite sides of the body 10 and with cutting teeth 21 at the tapered opposite end portions 22 of the body. Similar toothed ribs 23 are centrally arranged extending upwardly and downwardly upon the end portions 22 carried by the roof 17 and bottom 19 and forming with the ledge portions 21 four converging toothed portions or saws terminating at points 24 at the extreme opposite ends of the body 10.

The traveling of the automobile longitudinally in either direction will engage the saws 21 and the sharpened ledges 20 with any barrier such as a wire obstruction and the forward movement of the car will readily cut its path through such barrier permitting the car as well as soldiers to freely pass forwardly. A housing 24 is arranged upon the deck 18 having a plurality of openings or portholes 25 in the side thereof through which the soldiers in the cabin 11 may fire upon the enemy while adjustable roof portions 26 in the form of lids are hinged as at 27 upon the top of the housing 24 and adapted for adjustment at desired inclinations in the manner heretofore set forth for permitting the soldiers to fire through windows 28 arranged in the said lids.

A segment-shaped rack 29 is carried by each lid 26 within the cabin 11 arranged with an operating pinion 30 adapted to be turned by a sprocket-chain 31 arranged over a distant sprocket-wheel 32 adapted for operation by a crank-handle 33. A retaining means 34 is provided for the sprocket-wheel 32 for maintaining the rack 29 and its lid 26 at any adjusted position desired.

Sliding doors 35 are arranged for the windows 28 while spring-pressed latches 36 are carried by the top 37 of the housing 24 for retaining the lids 26 closed, the said latches being released from a point within the cabin 11 by operating the depending lever end portions 38 thereof.

The complete operation of the device will be apparent from the foregoing detailed description of its construction, it being noted that a suitable ladder 39 is arranged between the housing top 37 and a point adjacent the lower portion of the body 10 for permitting soldiers to readily enter the cabin 11 through either the windows 28 or through the top of the housing upon opening the lids 26. The car being suitably propelled and traveling through barriers as heretofore noted, the soldiers within the cabin 11 may readily fire upon the enemy and when desired may elevate the lids 26 to the required extent and fire through the windows 28 thereof. The soldiers within the car will be protected from the bullets of the enemy and may continue their warfare by aid of this device after the manner of a traveling fort.

What I claim as new is:—

1. An armored automobile comprising a cabin, a compartment surrounding the cabin having roof and bottom portions positioned in angular arrangement, a ledge at the outer edge of the device at the meeting line of said roof and bottom, the said ledge having a toothed portion at the opposite ends of the device and further having a sharpened flaring portion intermediate the said toothed portions and arranged at the longitudinal opposite sides of the device, and toothed ribs extending above and below said ledge and merging therewith at the extreme opposite ends of the automobile.

2. An armored automobile comprising a cabin, a compartment surrounding the cabin having roof and bottom portions positioned in angular arrangement, a ledge at the outer edge of the device at the meeting line of said roof and bottom, the said ledge having a toothed portion at the opposite ends of the device and further having a sharpened flaring portion intermediate the said toothed portions and arranged at the longitudinal opposite sides of the device, toothed ribs extending above and below said ledge and merging therewith at the extreme opposite ends of the automobile, a housing upon the cabin having portholes in the sides thereof and arranged with lids at the top of the housing having windows therein, adjusting means for said lids operable within the cabin, and releasable latches for the housing lids.

3. An armored automobile comprising a body, a wire-cutting ledge surrounding the body at its outermost substantially central line, a housing upon the body having portholes therein and arranged with hinged top sections provided with windows, latches upon the housing normally overlying the hinged portions when in their closed arrangement adapted for releasing from points within the device, racks upon said hinged portions, and operating means for the racks arranged within the device.

4. An armored automobile comprising a cabin, side portions substantially V-shaped in cross section entirely surrounding the cabin, a ledge at the outer edge of said side portion surrounding the automobile and having alternately arranged sharpened flaring portions and portions provided with cutting teeth, and toothed ribs upon said sides above and below the said ledge merging with the toothed portions thereof, the said ledge and ribs adapted for cutting purposes during the travel of the automobile in any direction.

In testimony whereof I affix my signature.

MARCIN ZAJAC. [L. S.]

Copies of this patent may be obtained for five cents each, by addressing the "Commissioner of Patents, Washington, D. C."